United States Patent [19]
Taylor, Jr.

[11] Patent Number: 5,269,635
[45] Date of Patent: Dec. 14, 1993

[54] SLURRY PROCESSING UNIT

[75] Inventor: Ancil S. Taylor, Jr., Gretna, La.

[73] Assignee: C. F. Bean Corporation, Belle Chasse, La.

[21] Appl. No.: 869,019

[22] Filed: Apr. 15, 1992

[51] Int. Cl.$^5$ .............................. B65G 53/66
[52] U.S. Cl. ........................ 406/10; 406/14; 406/19; 406/39; 406/94; 37/309
[58] Field of Search ............... 406/10, 12, 14, 19, 406/28, 38, 39, 46, 47, 48, 93, 94, 194; 37/54, 58, DIG. 1, DIG. 8; 405/158, 171

[56] References Cited

U.S. PATENT DOCUMENTS

| | | | |
|---|---|---|---|
| 4,327,759 | 5/1982 | Millis | 137/3 |
| 4,436,431 | 3/1984 | Strong et al. | 366/17 |
| 4,490,044 | 12/1984 | Saito et al. | 366/17 |
| 4,746,290 | 5/1988 | DeCicco et al. | 432/19 |
| 4,747,728 | 5/1988 | Norris et al. | 405/263 |
| 4,766,822 | 8/1988 | DeCicco et al. | 110/212 |
| 4,925,389 | 5/1990 | DeCicco et al. | 432/106 |
| 4,961,391 | 10/1990 | Mak et al. | 110/346 |
| 5,027,267 | 6/1991 | Pitts et al. | 364/172 |

Primary Examiner—David M. Mitchell
Assistant Examiner—Andrew C. Pike
Attorney, Agent, or Firm—Dennis T. Griggs

[57] ABSTRACT

By utilizing two inlet pumps and one discharge pump, and controlling the speed of the discharge pump, the pressure in a slurry processing unit can be controlled to facilitate measurement and handling of compressible slurry. It has been found that multiple specific gravity measurements with water injection between the measuring stations can provide an accurate indicate of clear water to be added, even though the slurry is compressible and of varying composition, by allowing controlled undershooting of the required water at one or more injection stations, followed by accurate specific gravity measurement under closely controlled pressure and flow rate conditions, followed by a small final clear water addition. Flow from an inlet clear water pump is distributed through at least two clear water injection pipes, including a first clear water injection pipe connected to slurry piping between the first and the second specific gravity sensors and a second injection pipe connected to the slurry piping between second and third specific gravity sensors. A controller receives analog signals from the specific gravity sensors and from the flow sensors and sends throttle signals to the clear water throttle valves and a speed control signal to the variable speed discharge pump.

11 Claims, 3 Drawing Sheets

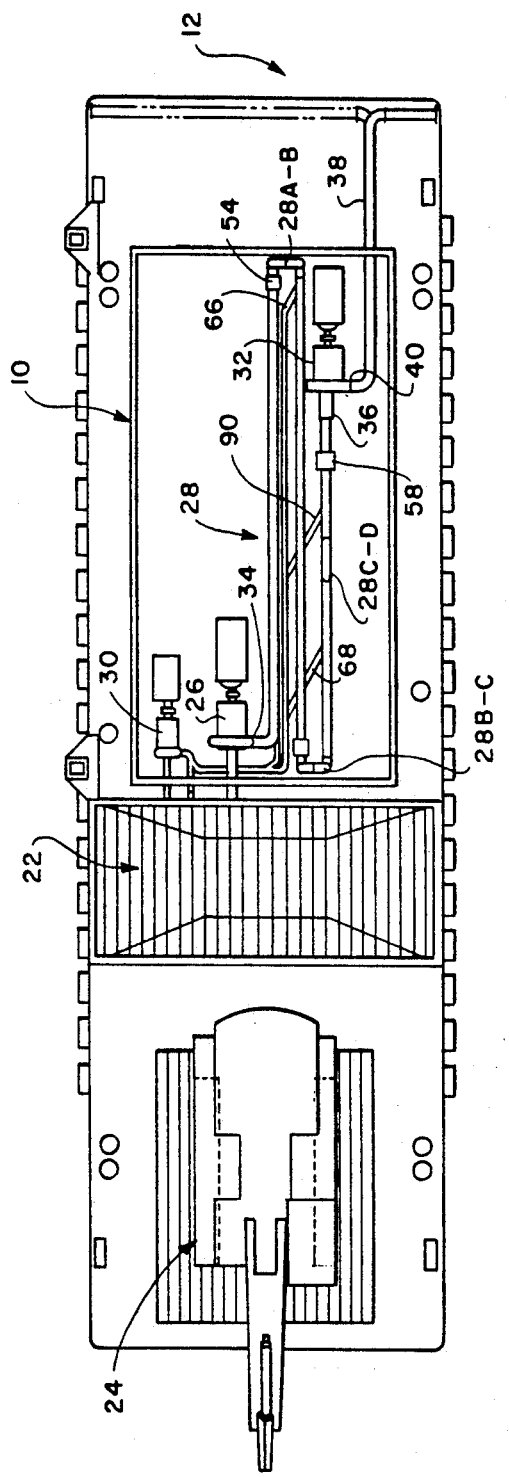
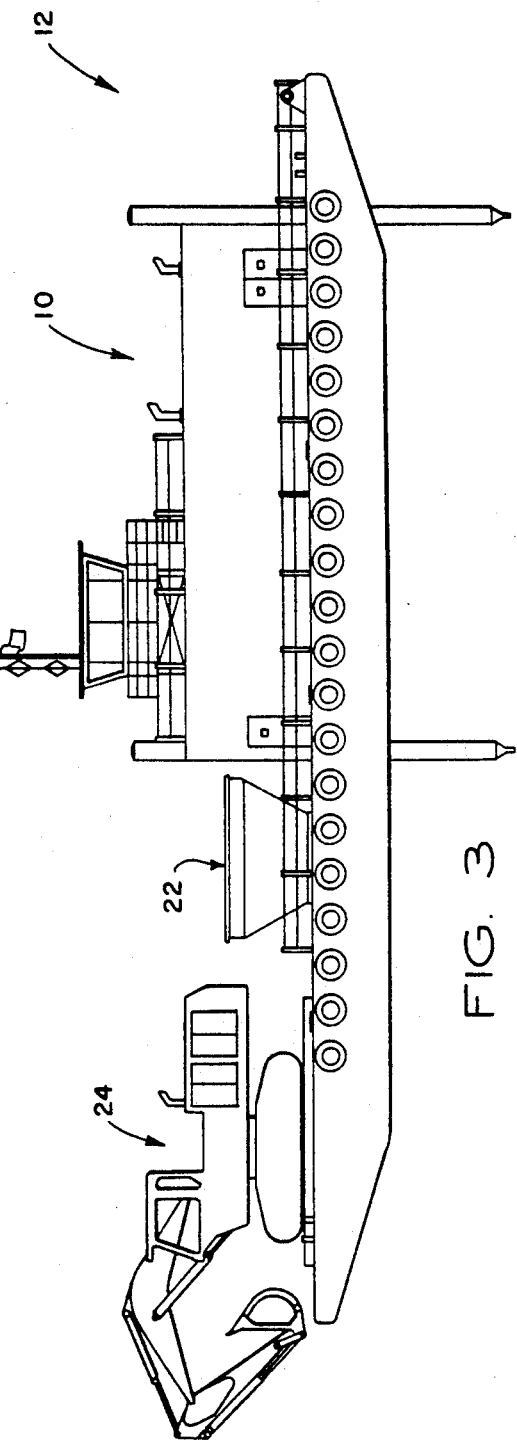
FIG. 2
FIG. 3

SLURRY PROCESSING UNIT

FIELD OF THE INVENTION

The present invention relates generally to systems for processing waste materials, and more particularly to a system for treating sludge dredged from a waterway with an appropriate amount of water to be pumpable through a floating pipeline.

BACKGROUND OF THE INVENTION

Much effort has been directed to cleaning up toxic wastes in a drive to restore our natural environment. Some of such toxic waste lies at the bottom of waterways. For treatment, such sludge is generally dredged up and transported to shore, either by barge, or pumped in slurry form through a floating pipeline.

The composition of such sludge is, of course, highly variable. The amount of water which must be added to provide a slurry with appropriate pumping characteristics is difficult to determine.

SUMMARY OF THE INVENTION

It has been found that, in addition to being of widely varying composition, the sludge is also significantly compressible. The compressibility causes further difficulty in that the combination of varying compositions and varying compressibilities make accurate measurement of the properties of the slurry difficult to obtain.

It has been found that by utilizing specific gravity sensors located at intervals along the slurry piping and by throttling the injection of clear water in between the specific gravity sensors, an accurate determination of appropriate total clear water injection can be made. It has also been found that by utilizing at least two inlet pumps and at least one discharge pump, and controlling the speed of the discharge pump, the pressure in the slurry processing unit can be controlled to facilitate measurement and handling of such compressible slurry. Such pump control together with multiple specific gravity measurements and water injection between the measurement stations provides an accurate indication of clear water to be injected, even though the sludge is compressible and of varying composition. This is achieved by allowing controlled undershooting of the required clear water at the first one or two injection stations, followed by an accurate specific gravity measurement under closely controlled pressure and flow rate conditions, followed by a final clear water addition.

Inlet slurry flow, inlet clear water flow, the discharge flow and the pressure in the slurry pipeline can all be controlled using a primary fixed speed inlet pump and a variable speed discharge pump together with throttling valves in the clear water injection pipes. This minimizes cost and avoids maintenance problems which would be caused by throttling valves in the slurry piping.

This is a slurry processing unit for pumping varying compositions of compressible slurry to a floating pipeline. In the preferred embodiment, the unit includes an inlet clear water pump and an inlet slurry pump, with the inlet slurry pump being operated at a constant pumping rate, and with flow of the inlet slurry pump not being throttled; a speed-controlled discharge pump; slurry piping connecting the output of the inlet slurry pump to the input of the discharge pump discharge piping connected between an outlet of the discharge pump and the floating pipeline; clear water piping having an input connected to the output of the inlet clear water pump, and having a clear water injection pipe connected to an intermediate point of the slurry piping; a first flow sensor located to directly or indirectly indicate flow in the slurry piping between the inlet slurry pump and the intermediate point and a second flow sensor to directly or indirectly indicate flow in the slurry piping between the intermediate point and the floating pipeline; and a controller for receiving signals from the first and second flow sensors and sending a control signal to control flow in the clear water injection pipe and sending a speed control signal to the discharge pump, whereby controlling the speed of the discharge pump controls pressure in the slurry processing unit to facilitate handling of the compressible slurry.

Preferably, the clear water piping has a third clear water output, the third clear water output being connected to the slurry piping between the third specific gravity sensor and the discharge pump. Neither the inlet slurry pump nor the inlet clear water pump is speed controlled Preferably the first, second and third specific gravity sensors are pressure sensors located at two different heights in substantially vertical sections of the slurry piping.

Alternately, this is a slurry processing unit for pumping varying compositions of compressible slurry to a floating pipeline, the processing unit including an inlet clear water pump and an inlet slurry pump; a discharge pump; slurry piping connecting the output of the inlet slurry pump to the input of the discharge pump; discharge piping connected between an outlet of the discharge pump and the floating pipeline; first, second and third specific gravity sensors located at intervals along the slurry piping; a first flow sensor located to directly or indirectly indicate flow in the slurry piping between the inlet slurry pump and the second specific gravity sensor, and a second flow sensor located to directly or indirectly indicate flow in the slurry piping between the second specific gravity sensor and the third specific gravity sensor, and a third flow sensor located to directly or indirectly indicate flow in the slurry piping between the third specific gravity sensor and the floating pipeline; clear water piping, the clear water piping having an input connected to the output of the inlet clear water pump, the clear water piping including a first clear water injection pipe with a first controllable throttle valve, and a second clear water injection pipe with a second controllable throttle valve, with the first clear water injection pipe connected to the slurry piping between the first and the second specific gravity sensors and with the second clear water injection pipe connected to the slurry piping between the second and the third specific gravity sensors, and preferably with a third clear water injection pipe connected to the slurry piping between the third specific gravity sensors and the floating pipeline; and a controller, the controller receiving signals from the first, second and third specific gravity sensors and from the flow sensors and sending at least one control signal to directly or indirectly control the clear water added to said slurry piping, preferably by sending a first throttle signal to the first controllable throttle valve, and to send a second throttle signal to the second controllable throttle valve, and to send a third throttle signal to the third controllable throttle valve.

This invention also includes a method for controlling slurry processing unit for pumping varying compositions of compressible slurry to a floating pipeline, with the unit having slurry piping connecting the output of an inlet slurry pump to the input of a discharge pump and with discharge piping connected between an outlet of the discharge pump and the floating pipeline. The method includes the steps: sensing specific gravity with first, second and third specific gravity sensors located at intervals along the slurry piping; sensing flow in the slurry processing unit with a first flow sensor located to directly or indirectly indicate flow in the slurry piping between the inlet slurry pump and the second specific gravity sensor, and with a second flow sensor located to directly or indirectly indicate flow in the slurry piping between the second specific gravity sensor and the third specific gravity sensor, and with a third flow sensor located to directly or indirectly indicate flow in the slurry piping between the third specific gravity sensor and the floating pipeline; injecting water from the inlet clear water pump into the slurry processing unit through clear water piping, the clear water piping having an input connected to the output of the inlet clear water pump, and having a first clear water injection pipe with a first throttle valve and a second clear water injection pipe with a second throttle valve, with the first clear water injection pipe connected to the slurry piping between the first and the second specific gravity sensors and with the second clear water injection pipe connected to the slurry piping between the second and the third specific gravity sensors; receiving signals from the first, second and third specific gravity sensors and from the first, second and third flow sensors in a controller, and sending a first throttle signal from the controller to control the first throttle valve and sending a second throttle signal from the controller to control the second throttle valve and sending a control signal from the controller to electrically speed control the discharge pump.

BRIEF DESCRIPTION OF THE DRAWINGS

This invention can be best understood by reference to the following drawings in which:

FIG. 2 is a plan view of a slurry processing unit mounted on a barge in plan view;

FIG. 3 shows the barge-mounted slurry processing unit in elevation; and,

DESCRIPTION OF THE PREFERRED EMBODIMENT

Figure 1:
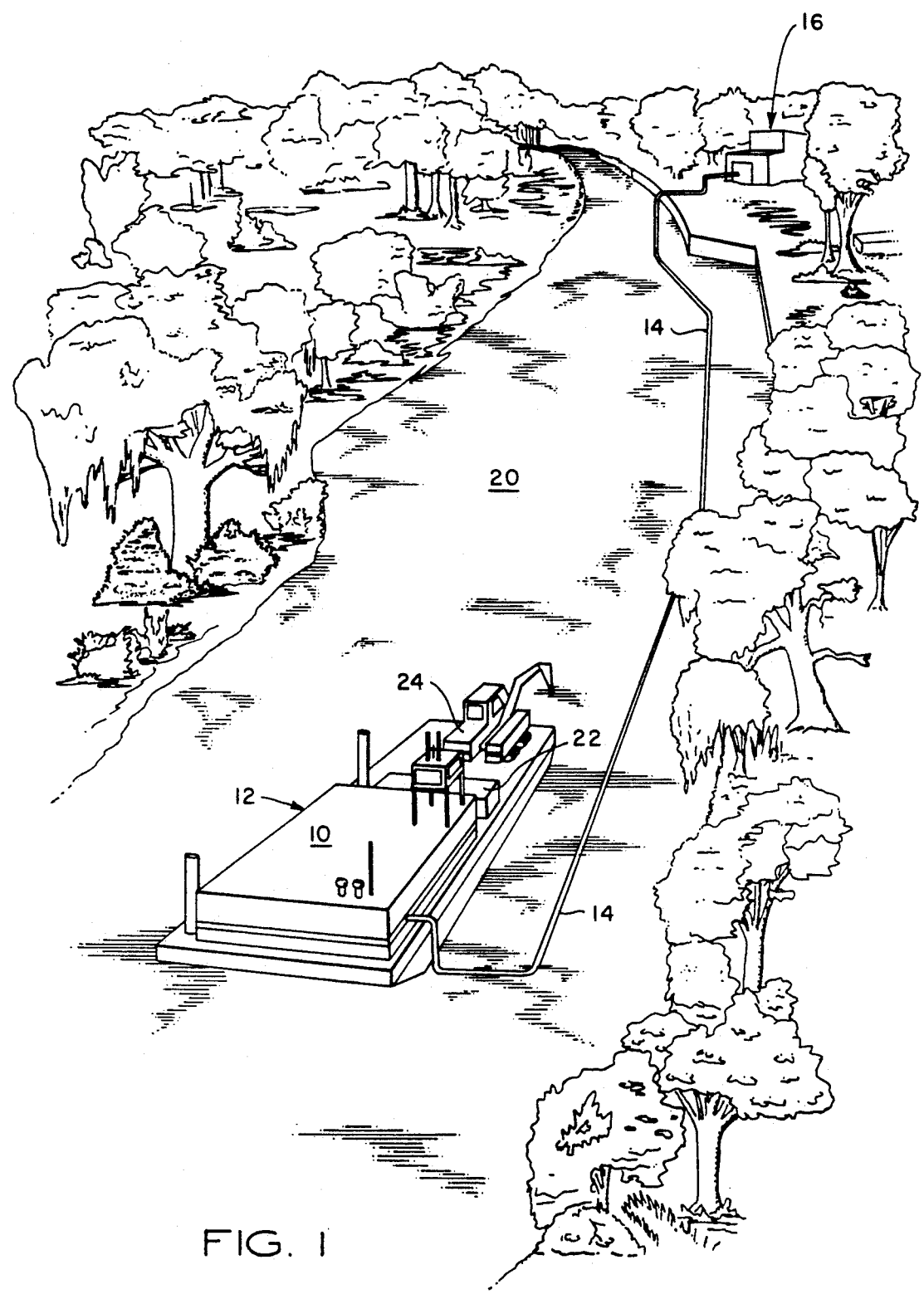
FIG. 1 shows a dredge, barge-mounted slurry processing unit, and a floating pipeline to an on-shore processing plant.

Referring now to FIG. 1–FIG. 4, a slurry processing unit 10 is mounted on a pumping barge 12 which transfers slurry through a pipeline 14 to a processing facility 16 on shore. Toxic sludge 18, for example creosote sludge, is dredged from the bottom of a river 20. The toxic sludge 18 is loaded into a sump 22 by means of a power loader 24. The sump 22 is more clearly shown in FIG. 2 and FIG. 3 Clear makeup water is pumped into the sump 22 and is mixed with the raw dredge material to produce a pumpable, raw slurry.

Further, on FIG. 2 is shown an inlet slurry pump 26 and slurry piping 28. Also shown in inlet clear water pump 30 and slurry discharge pump 32. The discharge pump 32 is speed controlled. The slurry piping 28 connects the output 34 of the inlet slurry pump 26 to the input 36 of the discharge pump 32. In addition, there is discharge piping 38 connected between the outlet 40 of the discharge pump 32 and the floating pipeline 14 (FIG. 1). Specific gravity sensor pairs 42, 44 and 46, 48 and 50, 52 are located at spaced locations along the slurry piping sections 28A, 28B and 28C, respectively. The sensor units of each pair provide analog signals which are combined to produce a specific gravity value which is characteristic of the slurry flowing through the slurry piping section extending between the sensor units of each sensor pair. Also shown are flow sensors 54, 56 and 58 connected between the slurry piping sections. FIG. 3 shows an elevation of the pumping barge and the relationship between power loader 24 and the sump 22.

Figure 4:
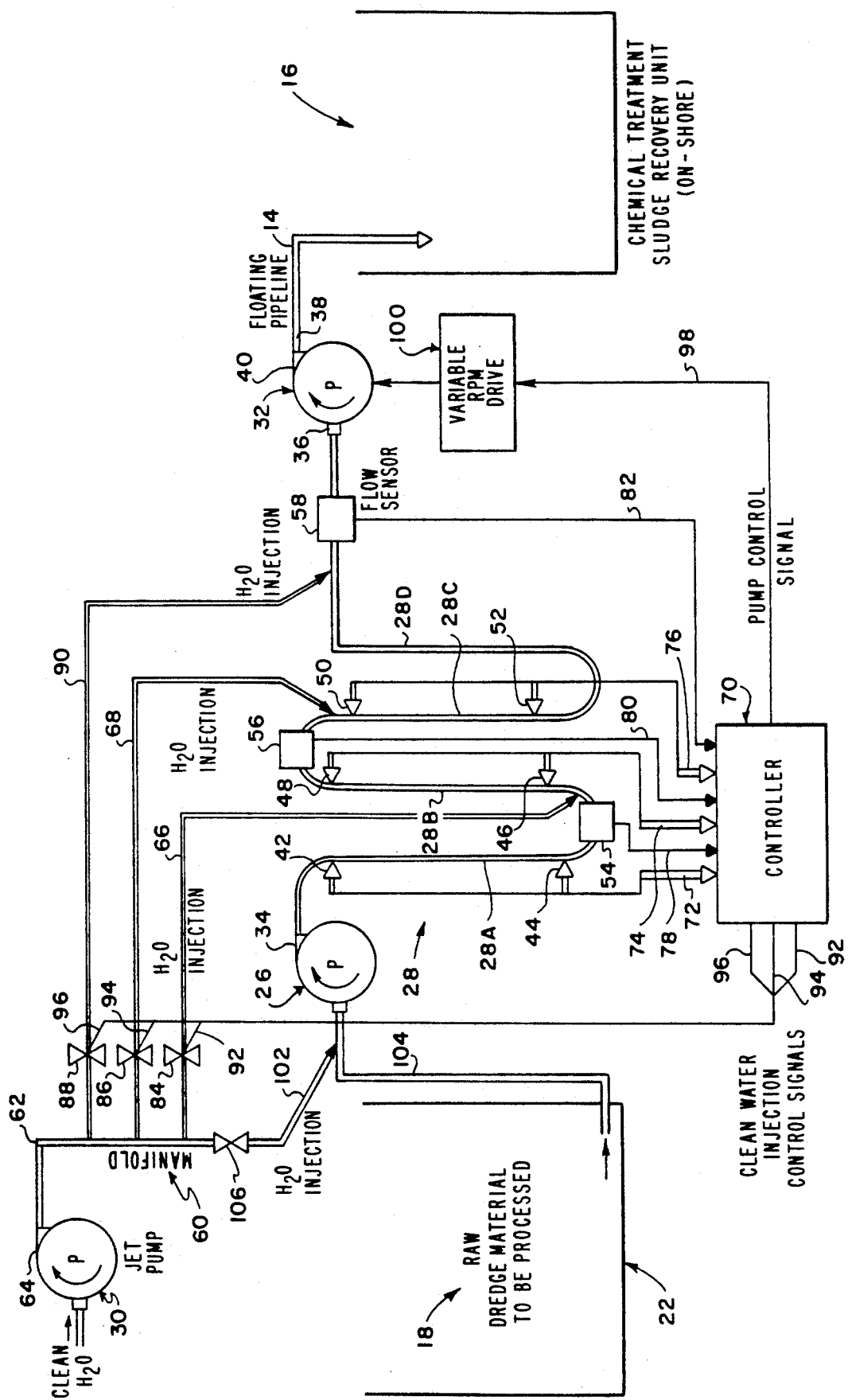
FIG. 4 shows a schematic slurry piping and signal flow diagram.

FIG. 4 shows the injection of clear water into the slurry piping 28 between the adjoining piping sections 28A, 28B and 28B, 28C and the terminal section 28D. In particular, the clear water piping has a manifold 60 with an inlet port 62 connected to the output 64 of the inlet clear water pump 30 and has multiple clear water outputs, including a first clear water injection pipe 66 connected to the slurry piping section 28B between the second and third specific gravity sensors 44, 46, and a second clear water injection pipe 68 connected to the slurry piping section 28C between the third and fourth specific gravity sensors 46, 48.

The first flow sensor 54 is connected in the slurry piping between the first piping section 28A and second piping section 28B, and between the second and third specific gravity sensors 44, 46. The second flow sensor 56 is connected in the slurry piping between the fourth specific gravity sensor 48 and the fifth specific gravity sensor 50. The third flow sensor 58 is connected in the terminal piping section 28D between the sixth specific gravity sensor 52 and the inlet port 36 of the slurry discharge pump 32.

A controller 70 receives analog specific gravity signals 72, 74, 76 from the specific gravity sensors 42, 44, 46, 48, 50 and 52, respectively and analog flow signals 78, 80 and 82 from the flow sensors 54, 56 and 58, respectively. A first controllable throttle valve 84 is connected in the first clear water injection pipe 66. A second controllable throttle valve 86 is in the second clear water injection pipe 68. An optical third controllable throttle valve 88 is connected in an optional third clear water injection pipe 90, with the third injection pipe 90, if used, being connected to the terminal piping section 28D between specific gravity sensor 52 and the discharge pump 32.

The controller 70 receives signals from the specific gravity sensors and from the flow sensors and sends first, second and third throttle signals 92, 94 and 96 to the first, second and third controllable throttle valves 84, 86 and 88, respectively. The controller 70 also sends a speed control signal 98 to a variable rpm drive 100 to control the output of the discharge pump 32.

Initially, the combination of specific gravity sensor signals, flow sensor signals, and water injection provides rough specific gravity measurements. Then, after a first dilution and after a second dilution (each dilution with a known amount of clear water), an accurate determination of appropriate total clear water addition is mae. It has further been found that by controlling the flow rate of the discharge pump 32, that the pressure in the slurry processing unit 10 can be controlled. As the slurry is compressible, this pressure control is important in the accurate determination of appropriate total clear water addition to be made.

The specific gravity sensors 42, 44, 46, 48 and 50, 52 can comprise pressure sensors located at first and second elevations in the substantially vertical sections 28A, 28B and 28C of slurry piping. While the unit preferably is as described above, the clear water piping may be operated without the controllable throttle valve and especially without the third controllable throttle valve 88 and the third clear water injection pipe 90.

An auxiliary clear water line 102 connected in the main slurry inlet conduit 104 can also be used to introduce clear water for dilution, or can be used to aid in flushing the system, with shutoff valve 106 only opened during cleaning.

It can be seen that the system can be controlled using a variable speed drive 100 to control the pumping rate of the output pump 32. In particular, for example, the flow of the inlet slurry pump 26 can be controlled by throttling the clear water injection and by speed controlling the discharge pump 32 even though the inlet slurry flow is not controlled or throttled.

The invention is not to be construed as limited to the particular examples described herein, as these are to be regarded as illustrative rather than restrictive. For example, instead of directly measuring flow rate at the locations of flow sensors 54 and 56, these flow rates could be indirectly determined by knowing the flow from flow sensor 58 and by measuring the clear water flows injected through water outputs 66 and 68. Similarly, the unit of FIG. 4 could be operated with only two flow sensors and with only one specific gravity sensor, especially if the sludge is not significantly compressible. It will also be appreciated that the features of speed controlling the discharge pump, and of controlling two or more throttle valves in conjunction with signals from first and second gravity sensors can be used separately. The invention is intended to cover all embodiments which do not depart from the spirit and scope of the invention.

What is claimed is:

1. A slurry processing unit for pumping varying compositions of slurry through a floating pipeline, said unit comprising:
   at least two inlet pumps, including an inlet clear water pump and an inlet slurry pump;
   a variable flow rate discharge pump having an inlet port and an outlet port;
   slurry piping connecting the output of said inlet slurry pump tot he input of said discharge pump;
   discharge piping coupled to the outlet port of said discharge pump for connection to the floating pipeline;
   first, second and third specific gravity sensors connected in said slurry piping at spaced locations;
   a first flow sensor coupled to said slurry piping between said inlet slurry pump and said second specific gravity sensor, and a second flow sensor coupled to said slurry piping between said second specific gravity sensor and said third specific gravity sensor, and a third flow sensor coupled to said slurry piping between said third specific gravity sensor and said discharge pump, said first, second and third flow sensors each including means for generating first, second and third analog signals proportional to fluid flow through each slurry piping, respectively;
   clear water piping, said clear water piping having an input connected to the output f said inlet clear water pump, said clear water piping including a first clear water injection pipe with a first controllable throttle valve, and a second clear water injection pipe with a second controllable throttle valve, said first clear water injection pipe being connected to said slurry piping between said first and said second specific gravity sensors, and said second clear water injection pipe being connected to said slurry piping between said second and said third specific gravity sensors; and,
   a controller connected to receive analog signals from said first, second and third specific gravity sensors and said analog signals from said flow sensors, said controller including means for sending a first control signal to said first controllable throttle valve, a second control signal to said second controllable throttle valve and a speed control signal to said discharge pump in response to said analog signals.

2. A slurry processing unit as defined in claim 1, wherein said clear water piping has a third clear injection pipe with a controllable throttle valve, said third clear injection pipe being connected to said slurry piping between said third specific gravity sensor and said discharge pump.

3. A slurry processing unit as defined in claim 1, wherein said inlet slurry pump is operable at a fixed flow rate.

4. A slurry processing unit as defined in claim 3, wherein flow of said inlet slurry pump is not throttled.

5. A slurry processing unit as defined in claim 1, wherein said first, second and third specific gravity sensors each comprise two pressure sensors at different heights of vertical sections of said slurry piping.

6. The unit of claim 1, wherein said first flow sensor is located in said slurry piping between said inlet slurry pump and said second specific gravity sensor, and said second flow sensor is located in said slurry piping between said second specific gravity sensor and said third specific gravity sensor, and said third flow sensor is located in said slurry piping between said third specific gravity sensor and the inlet port of said discharge pump.

7. A slurry processing unit for pumping varying compositions of slurry through a floating pipeline, said unit comprising:
   two inlet pumps, including an inlet clear water pump and an inlet slurry pump, said inlet slurry pump not being electrically speed controlled, and flow of said inlet slurry pump not being throttled;
   a variable flow rate discharge pump;
   slurry piping connecting the output of said inlet slurry pump to the input of said discharge pump;
   discharge piping connected between an outlet of said discharge pump and said floating pipeline;
   clear water piping, said clear water piping having an input connected to the output of said inlet clear water pump, and having a clear water injection pipe connected to an intermediate point of said slurry piping;
   a first flow sensor coupled to said slurry piping between said inlet slurry pump and said intermediate point and a second flow sensor coupled to said slurry piping between said intermediate point and said floating pipeline, said first and second flow sensors each including means for generating first and second analog signals proportional to fluid flow through each slurry piping, respectively;
   a controller connected to receive the analog signals from said first and second flow sensors, said controller including means to send a flow control signal to said discharge pump to control flow in said clear water injection pipe.

8. A slurry processing unit for pumping varying compositions of slurry through a floating pipeline, said unit comprising:
at least two inlet pumps, including an inlet clear water pump and an inlet slurry pump;
a discharge pump;
slurry piping connecting the output of said inlet slurry pump to the input of said discharge pump;
discharge piping connected between an outlet of said discharge pump and said floating pipeline;
first, second and third specific gravity sensors coupled to said slurry piping at spaced intervals;
a first flow sensor coupled to said slurry piping between said inlet slurry pump and said second specific gravity sensor, and a second flow sensor coupled to said slurry piping between said second specific gravity sensor and said third specific gravity sensor, and a third flow sensor coupled to said slurry piping between said third specific gravity sensor and said floating pipeline, said first, second and third flow sensors each including means for generating first, second and third analog signals proportional to fluid flow through each slurry piping, respectively;
clear water piping, said clear water piping having an input connected to the output f said inlet clear water pump, and having first and second clear water outputs respectively, said first clear water output being connected to said slurry piping between said first and said second specific gravity sensors and said second clear water output being connected to said slurry piping between said second and said third specific gravity sensors; and,
a controller connected to receive analog signals from said first, second and third specific gravity sensors and said analog signals from said flow sensors, said controller including means to send at least one control signal to said inlet clear water pump for controlling the flow of clear water added to said slurry piping.

9. A slurry processing unit as defined in claim 8, said clear water piping including first, second and third clear water injection pipes and first, second and third controllable throttle valves, respectively, said first clear water injection pipe and first throttle valve being connected to said slurry piping between said first and said second specific gravity sensors, said second clear water injection pipe and second throttle valve being connected to said slurry piping between said second and said third specific gravity sensors, and said third clear water injection pipe and third controllable throttle valve being connected to said slurry piping between said third specific gravity sensors and said discharge pump.

10. A method for controlling a slurry processing unit for pumping varying compositions of slurry through a floating pipeline, said unit having slurry piping connecting the output of an inlet slurry pump to the input of a discharge pump and discharge piping connected between an outlet of said discharge pump for connection to said floating pipeline, said method comprising:
sensing the specific gravity of a compressible slurry with first, second and third specific gravity sensors located at spaced locations along said slurry piping;
sensing flow in said slurry processing unit with a first flow sensor coupled to said slurry piping between said inlet slurry pump and said second specific gravity sensor, and with a second flow sensor coupled to said slurry piping between said second specific gravity sensor and said third specific gravity sensor, and with a third flow sensor coupled to said slurry piping between said third specific gravity sensor and said floating pipeline, said first, second and third flow sensors each including means for generating first, second and third analog signals proportional to fluid flow through each slurry piping, respectively;
injecting water into said slurry processing unit through clear water piping, said clear water piping having an input connected to the output of an inlet clear water pump, and having a first clear water injection pipe with a first throttle valve and a second clear water injection pipe with a second throttle valve, said first clear water injection pipe being connected to said slurry piping between said first and said second specific gravity sensors and said second clear water injection pipe being connected to said slurry piping between said second and said third specific gravity sensors; and
receiving analog signals from said first, second and third specific gravity sensors and said analog signals from said first, second and third flow sensors in a controller, and sending a first throttle signal from said controller to control said first throttle valve and sending a second throttle signal from said controller to control said second throttle valve, and sending a control signal from said controller to control the pumping rate of said discharge pump.

11. A slurry processing unit for pumping varying compositions of slurry through a floating pipeline, said unit comprising:
at least two inlet pumps, including an inlet clear water pump and an inlet slurry pump;
a discharge pump;
slurry piping connecting the output of said inlet slurry pump to the input of said discharge pump;
discharge piping connected between an outlet of said discharge pump and said floating pipeline;
first, second and third specific gravity sensors located at intervals along said slurry piping;
a first flow sensor coupled to said slurry piping between said inlet slurry pump and said second specific gravity sensor, and a second flow sensor coupled to said slurry piping between said second specific gravity sensor and said third specific gravity sensor, and a third flow sensor coupled to said slurry piping between said third specific gravity sensor and said floating pipeline, said first, second and third flow sensors each including means for generating first, second and third analog signals proportional to fluid flow through each slurry piping, respectively;
clear water piping, said clear water piping having an input connected to the output of said inlet clear water pump, said clear water piping including a first clear water injection pipe with a first controllable throttle valve, and a second clear water injection pipe with a second controllable throttle valve, said first clear water injection pipe being connected to said slurry piping between said first and said second specific gravity sensors and said second clear water injection pipe being connected to said slurry piping between said second and said third specific gravity sensors; and,
a controller connected to receive signals from said first, second and third specific gravity sensors and said analog signals from said flow sensors, said controller including means to send a first throttle signal to said first controllable throttle valve, and to send a second throttle signal to said second controllable throttle valve.

* * * * *